United States Patent [19]

Kimura et al.

[11] Patent Number: 4,958,217

[45] Date of Patent: Sep. 18, 1990

[54] IMAGE PROCESSING APPARATUS AND METHOD CAPABLE OF EXTRACTING A PARTICULAR IMAGE AREA USING EITHER HUE OR BRIGHTNESS

[75] Inventors: Hiroyuki Kimura; Takeshi Kobayashi, both of Yokohama; Makoto Katsuma, Wako; Kazunobu Urushihara, Inagi; Susumu Matsumura, Yokohama; Hiroshi Ohmura, Wako, all of Japan

[73] Assignee: Canon Kabushiki Kaisha, Tokyo, Japan

[21] Appl. No.: 386,004

[22] Filed: Jul. 27, 1989

Related U.S. Application Data

[63] Continuation of Ser. No. 17,587, Feb. 24, 1987, abandoned.

[30] Foreign Application Priority Data

Feb. 27, 1986 [JP]  Japan ................................ 61-040424

[51] Int. Cl.$^5$ ............................................. H04N 1/46
[52] U.S. Cl. ........................................ 358/75; 358/78
[58] Field of Search ................... 358/75, 76, 78, 28

[56] References Cited

U.S. PATENT DOCUMENTS

| | | | |
|---|---|---|---|
| 4,110,826 | 8/1978 | Möllgaard et al. | 358/75 |
| 4,261,011 | 4/1981 | Knop | 358/75 |
| 4,369,461 | 1/1983 | Tamura | 358/75 |
| 4,496,968 | 1/1985 | Pugsley | 358/80 |
| 4,668,979 | 5/1987 | Jüng | 358/80 |
| 4,689,666 | 8/1987 | Hatanaka | 358/75 |
| 4,769,695 | 9/1988 | Terashita | 358/76 |

*Primary Examiner*—James J. Groody
*Assistant Examiner*—Robert M. Bauer
*Attorney, Agent, or Firm*—Fitzpatrick, Cella, Harper & Scinto

[57] ABSTRACT

An image processing apparatus capable of extracting a particular image area from an image by designating a color hue of the desired particular image area. After indication on one or more points in an object region of interest, an initial range of hue or of brightness is designated, and a predetermined color is painted throughout a region adjacent to the indicated point(s) and having a hue or brightness, respectively, within the predetermined range. If that process results in the coloring of an area exceeding that which the operator desires to cover, the predetermined range of hue or brightness, as the case may be, is narrowed, and the process is repeated.

24 Claims, 3 Drawing Sheets

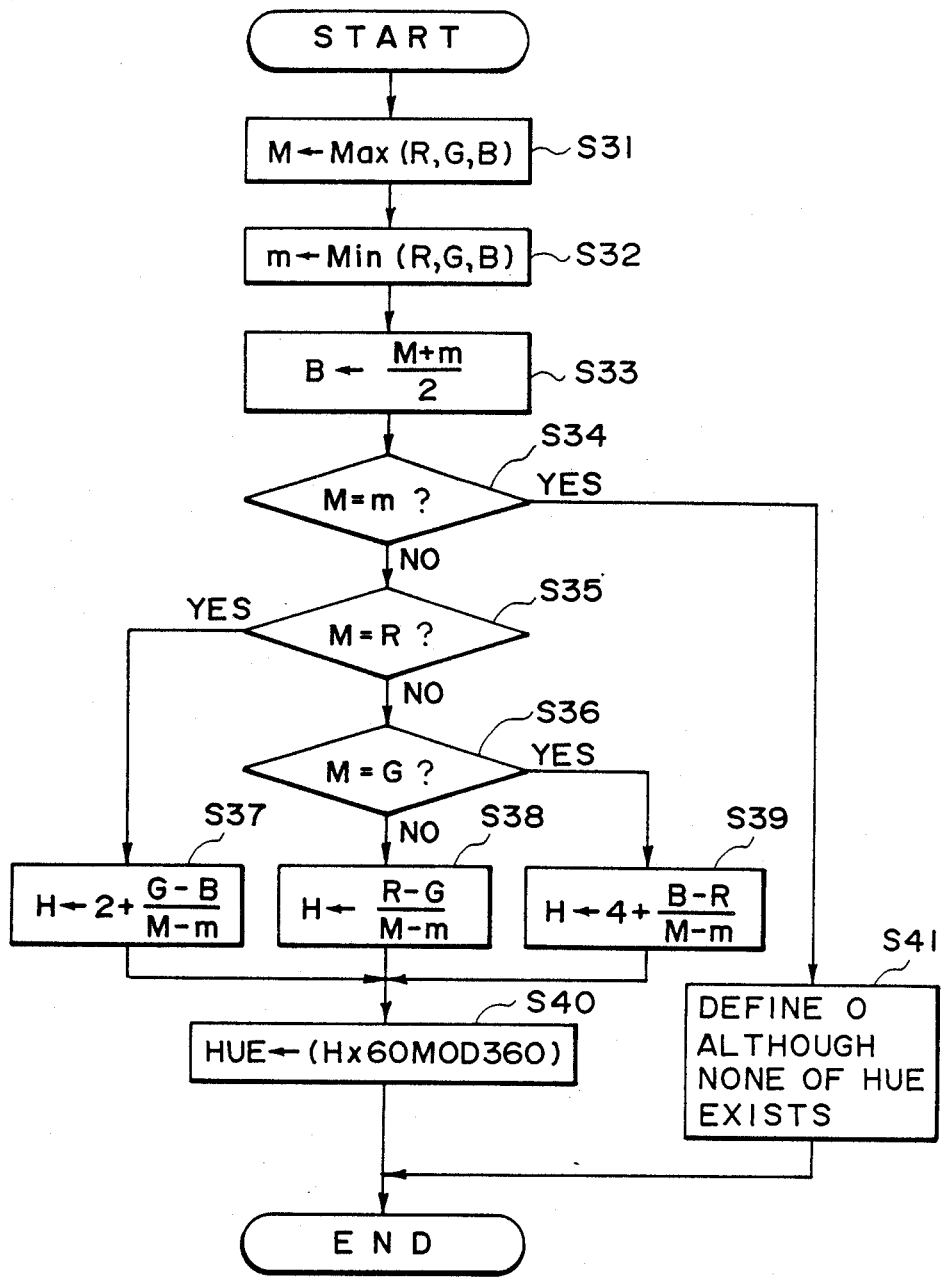
F I G. 3

IMAGE PROCESSING APPARATUS AND METHOD CAPABLE OF EXTRACTING A PARTICULAR IMAGE AREA USING EITHER HUE OR BRIGHTNESS

This application is a continuation of application Ser. No. 07/017,587 filed Feb. 24, 1987 now abandoned.

BACKGROUND OF THE INVENTION

1. Field of the Invention

The present invention relates to an image processing apparatus, and more particularly to such image processing apparatus capable of extracting a particular image area and a process therefor.

2. Related Background Art

For the purpose of image synthesis, it is necessary to extract particular image areas from various images. The extracted image area will be hereinafter called the object area, and the remaining area will be called the background area. A conventional method consists of cutting out the object area with a cutter, or painting the background area with a brush; and such operation requires considerable skill as well as significant time and labor. However, such drawbacks are prevented by a recently developed apparatus in which an image area extraction can be achieved on a display, for example, with a digitizer or the like. Such apparatus is advantageous in that the extraction can be made on an enlarged display image and that an error in operation can be easily corrected, but delicate and precise extraction still requires skill and labor.

Therefore, for automating such image extraction there have been proposed a method of extracting the edge of an object area, and a method of extracting an object area by the uniformity of three primary colors, red, green and blue. The former edge extraction method consists of conducting an edge enhancement, and painting uniformly the interior of the thus obtained edge line. However, such painting step is sometimes difficult because the edge line does not necessarily define a closed area. Also, there remains a problem of how to treat the unnecessary edge line formed for example by a noise component in the image. The latter, three primary color method extracts the object area by reading the three primary color values of a pixel and by judging whether said values are close to those of a neighboring pixel. However, this method does not allow approximate extraction of the object area since the three primary color values vary considerably, even for the skin color of a human face, for example between the nose in the sunlight and the forehead shadowed by the hair.

SUMMARY OF THE INVENTION

An object of the present invention is to provide an image processing apparatus for extracting a desired image area without the above-mentioned drawbacks of the prior technology, and a method adapted for use therein.

Another object of the present invention is to provide an image processing apparatus capable of extracting a predetermined image area based on the color hue values of a color image.

Still another object of the present invention is to provide an image processing apparatus capable of extracting a predetermined image area based on brightness values of a color image.

Still another object of the present invention is to provide an image processing apparatus capable of selecting either the brightness values or the color hue values for extracting an image area, according to the image to be extracted.

The foregoing and still other objects features and advantages of the present invention will become fully apparent from the following detailed description of the preferred embodiment, which is to be taken in conjunction with the attached drawings.

BRIEF DESCRIPTION OF THE DRAWINGS

FIG. 3 is a flow chart showing a procedure of calculating color hue values or brightness values.

DETAILED DESCRIPTION OF THE PREFERRED EMBODIMENT

Figure 1:
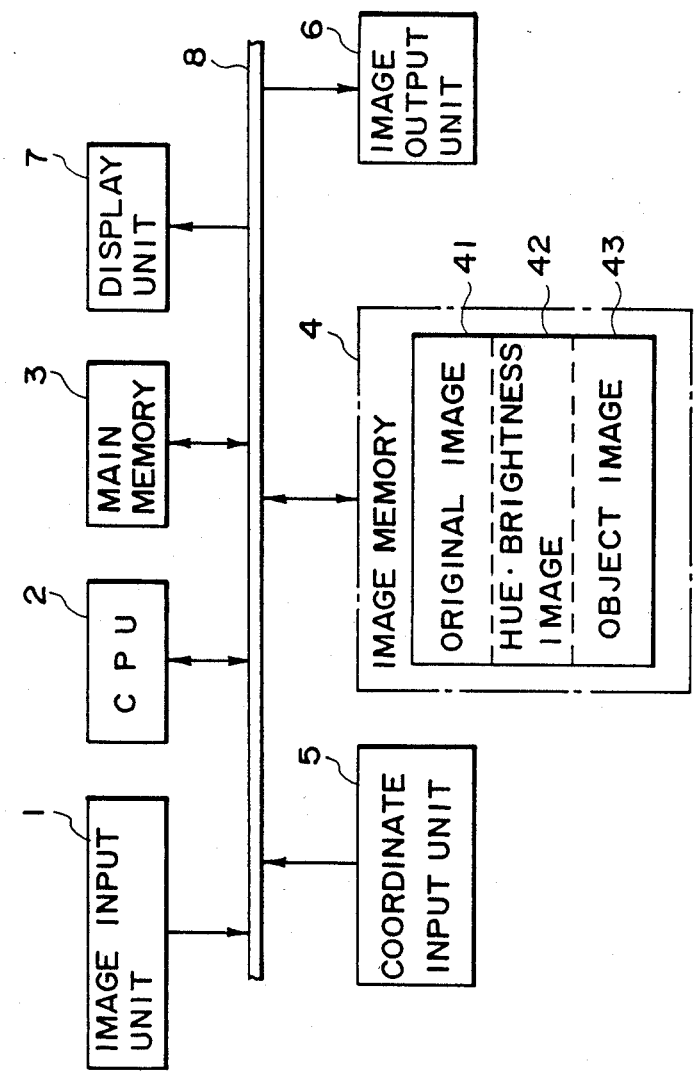
FIG. 1 is a block diagram of an image processing apparatus embodying the present invention.

Now the present invention will be clarified by an embodiment shown in FIG. 1. FIG. 1 shows an embodiment of the image processing apparatus for extract a predetermined object area from original image information of three primary colors entered from an image input device 1. The apparatus is provided with process means (CPU) 2 for determining the color hue values and the brightness values for each pixel of an original image 41 of three primary colors stored in an image memory 4 and storing a hue-brightness image 42 obtained from thus determined hue value and brightness value in the image memory 4; discrimination method selecting means (CPU) 2 for selecting either a discrimination by hue or a discrimination by brightness, based on the hue value and brightness value determined at least a pixel of the original image 41, designated by a coordinate input unit 5; and area extracting means (CPU) 2 for extracting an object area of the original image 41 corresponding to a hue-brightness image 42 having hue values or brightness values within a predetermined range with respect to a hue value or a brightness value determined on said designated pixel according to the thus selected discriminating method.

Referring to the structure shown in FIG. 1, an original image 41 of three primary colors entered from an image input unit 1 is displayed on a display unit 7. Observing said display of the original image 41, the operator determines the object area to be extracted. Then the operator designates, by the coordinate input unit 5, a pixel point to be included in the object area. The discrimination method selecting means (CPU) 2 selects either the discrimination by hue or discrimination by brightness, based on the hue value and the brightness value determined by the designated pixel. Then the area extracting means (CPU) 2 extracts the object area of the original image 41, corresponding to the hue-brightness image 42 of hue values or brightness values within a predetermined range with respect to the hue value or brightness value determined on said designated pixel, according to the selected discriminating method.

In the following said embodiment will be clarified in greater detail, with reference to the attached drawings.

Referring to FIG. 1 showing a block diagram of an embodiment of the image processing apparatus, an image input unit 1 such as a CCD camera or a drum scanner generates digital image data of three primary colors, e.g., red, green and blue, which are stored, through the central processing unit (CPU) 2, in an original image area 41 of an image memory 4. The image in the original image area 41 is subjected, by the CPU 2, to the calculation of the hue values and the brightness values, and the results of the calculation are stored in a hue-brightness image area 42. The CPU 2 further processes the image of the hue-brightness image area 42 and registers the finally extracted image in an object image area 43. A coordinate input unit 5, for entering image input commands coordinate data necessary for extracting the object area, is composed for example of a digitizer. A color monitor unit 7 displays various images from among those stored in the image memory 4, according to necessity. An image output unit 6, such as a printer or a film recorder, is utilized for releasing an image after the extraction of the object area, an image with erased background, a mask used for extracting the object area etc. These processes and controls are conducted by the CPU 2 according to programs illustrated in FIGS. 2 and 3, which are stored in a main memory 3 composed of a RAM and a ROM. 8 indicates a common bus of the CPU 2.

In the following there will be explained the procedure of extracting an object area in this embodiment.

FIG. 3 shows a flow chart of calculation of the hue and brightness values. A step S31 extracts, from the R, G and B values of a pixel, maximum data Max (R, G, B) and stores the data in a register M. Then a step S32 extracts and registers minimum data Min (R, G, B) in a register m. A step S33 adds the contents of the registers M and m, then divides the result of the addition by 2, and stores the obtained result in a brightness register B. In this manner the brightness is extracted from the data of three primary colors (the hue being disregarded in this step) and stored in the hue-brightness image area 42. A step S34 then discriminates whether the contents of the registers M and m are equal, and, if they are equal indicating the absence of hue, the program jumps to a step S41, to define this state by "0". If they are not equal, a step S35 discriminates whether the contents of the register M and a register R are equal. In mutually equal case, indicating the presence of a large proportion of red component, the program proceeds to a step S37 to store the result of a calculation $\{2+(G-B)/(M-m)\}$ in a hue register H. The "2" in this calculation is a multiplier on an angle 60° in a step S40 to be explained later, and signifies that red-rich hues are encoded into angles around 120°. In a case where the step S35 identifies a non-equal case, a step S36 discriminates whether the contents of the register M and a register G are mutually equal. If so, indicating the presence of a large proportion of green component, the program proceeds to a step S39, to store the result of a calculation $\{4+(B-R)/(M-m)\}$ in the hue register H. The "4" signifies that the green-rich hues are encoded around 240°. In a case where the step S36 identifies a non-equal case, indicating the presence of a large proportion of blue component, the program proceeds to a step S38, to store the result of a calculation $\{(R-G)/(M-m)\}$ in the hue register H. This calculation indicates that the green-rich hues are encoded around an angle 0°. A step S40 performs encoding into an angle (degrees) by multiplying the content of the hue register H by 60. In this manner the hue is extracted from the data of three primary colors, the brightness being disregarded, and stored in the hue-brightness image area 42.

Figure 2:
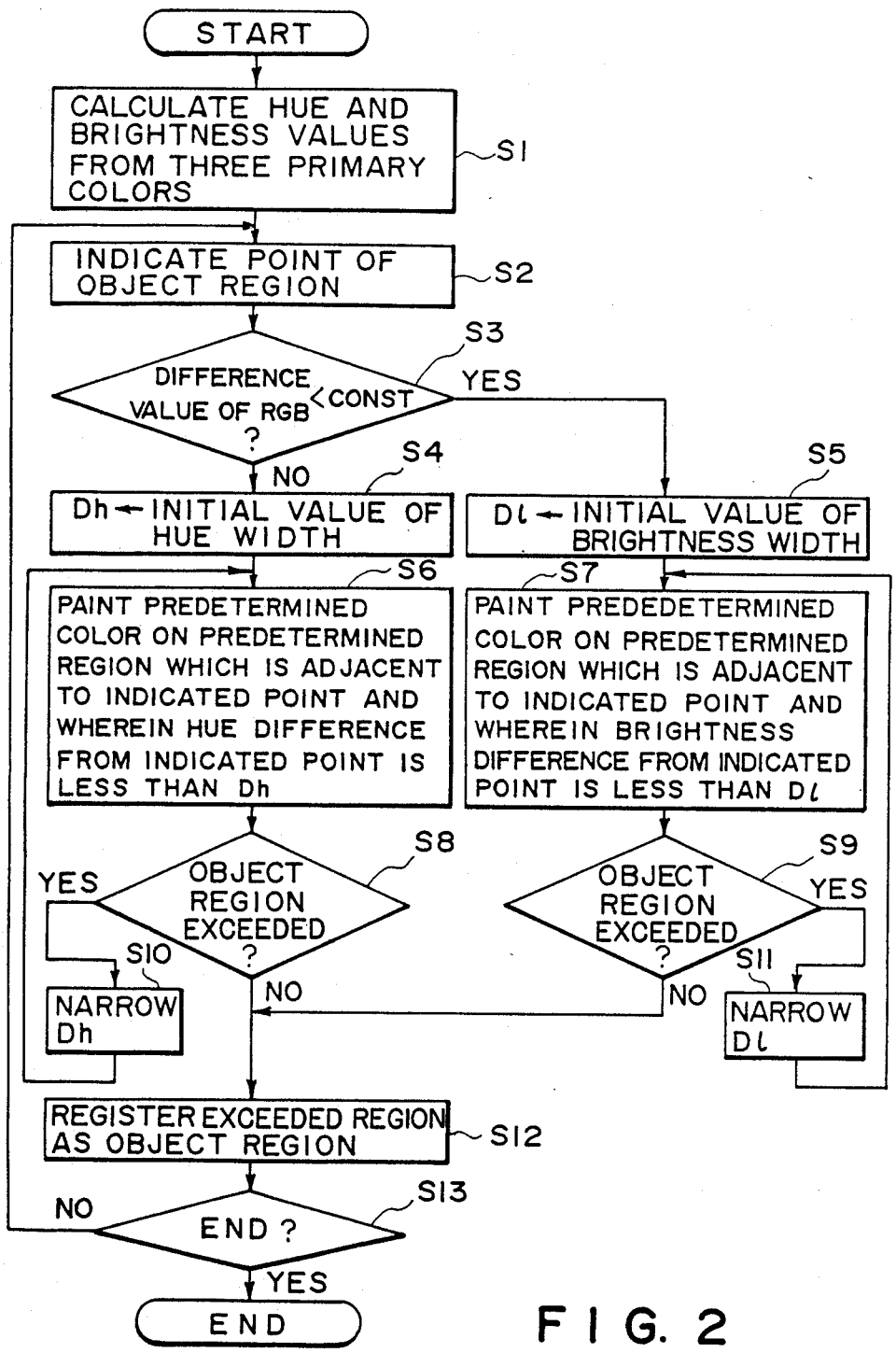
FIG. 2 is a flow chart showing a procedure of object area extraction.

FIG. 2 is a flow chart of the procedure of extracting the object image. At first an original image is entered from the image input unit 1 into the CPU 2. The original image is separated into three primary colors of red, green and blue, then digitized and stored in the area 41 of the image memory 4. A step S1 calculates the hue and brightness from three primary color values of each pixel of the original image, for example according to the procedure shown in FIG. 3, and stores the obtained results in the hue-brightness image area 42. A step S2 displays the original image 41 on the monitor 7, and the operator determines an object area to be extracted and designates a suitable point therein for example with a digitizer pen. More specifically, a cursor is indicated on the monitor 7 corresponding to the position of the digitizer pen, and the cursor is brought into the object area by the movement of the digitizer pen. When a switch of the digitizer pen is pushed in this state, the coordinate values of the position of the cursor are send into the CPU 2. A step S3 reads the three primary color values of red, green and blue of a pixel in the original image 41 corresponding to the coordinate values, and calculates the difference between the maximum and minimum values of the three primary color values. If the difference exceeds a constant threshold value, the program proceeds to a step S4, to proceed to object area extraction based on the hue. A difference exceeding the threshold value indicates that the area has a hue, which can be utilized for distinguishing the area from background area. On the other hand, if the difference is smaller than a constant threshold value, the program proceeds to a step S5, to proceed to object area extraction based on the brightness. This case corresponds to the absence of hue, but the difference in brightness can be utilized for distinguishing the object area from the background area.

In the object area extraction based on the hue, the step S4 stores an initial value of the range of hue in a hue width register Dh. In the preceding step S2 the operator designated a suitable point in the object area, and the point is selected in consideration of the uniformity or similarity in hue of the object area. As an example, in the case of a human face, the selection designates the skin color at a point. As an alternative, it is also possible to designate several points instead of one point. A step S6 reads the hue data in the hue-brightness image area 42 and calculates an image area which is connected to the designated coordinate position and of which the hue value falls within a predetermined range with respect to the hue value of the designated pixel, and superposes the thus calculated area on the original image displayed on the monitor 7. In this manner the area satisfying the above-mentioned condition is painted with a predetermined color. Observing the area, the operator judges whether the painted area overflows the preselected object area, and enters an instruction "yes" or "no" through the coordinate input unit 5. If the painted area overflows the object area, a step S10 reduces the hue width and the program again calculates the image area, starting from the step S6. If the painted image area no longer overflows the object area after the repetition of such procedure, a step S12 extract the image area and stores it in the object image memory area 43. On the other hand, if the painted image area is smaller than the object area, the operator gives an instruction "yes" but gives an instruction "not complete" in a later step S13, whereby the program returns to the step S2 to enable the designation of the still unselected area. It is also possible to widen the range of hue and to return to the step S6 to repeat the calculation of the object area. The use of hue in the area calculation allows more precise object area extraction, since the three primary color values are variable according to illumination even for the same object whereas the hue is not affected by the illumination.

The procedure of area calculation based on the brightness is similar to that based on the hue explained before. A step S5 defines the width of brightness, then a step S7 determines an image area connected to the position of designated pixel, and a step S9 gradually reduces the width of brightness until thus determined image area matches the object area. If the values of three colors (red, green and blue) are alike, corresponding to an almost monochromatic color, the object area can be more easily determined from the brightness than from the slight differences in three primary color values. A step S12 registers the extracted image area in the object image memory area 43. In a step S13 the operator identifies whether the object area is still left, and, if left, the program returns to the step S2 to calculate another object area or a partially remaining object area left in the preceding procedure due to unsatisfactory area matching therein, by the designation of a suitable pixel in such object area. This procedure can be repeated until all the object areas are registered. Thereafter various processes are applied and there can be supplied a mask pattern for image extraction or an image with erased background area to the image output unit 6. Also the content of object image memory area 43 can be arbitrarily utilized for further processings.

As explained in the foregoing, the present invention allows to extract the object area from the information of hue instead of from the original information of three primary colors, so that the process of extraction can be significantly simplified, without the influence of illumination on the object.

Also, in the case of an object of almost monochromatic color, in which a slight difference in the primary colors results in a significant difference in the hue, the object area extraction can be achieved by the brightness instead of the hue. Moreover, the selection of such extracting methods is automatically done in the apparatus and is not a burden to the operator.

The advantage of the present invention is significant in that the operation which has conventionally required skill, labor and time can be achieved by a simple operation of the operator.

The present invention is not limited to the foregoing embodiment but is subject to various modifications and applications within the scope and spirit of the appended claims.

What is claimed is:

1. An image processing apparatus comprising:
   input means for entering color image information;
   designation means for designating a particular hue value in said color image information; and
   extraction means for extracting an image area from said color image information, based on said particular hue value, said particular hue value being determined from the hue value of a particular position in said color image information.

2. An image processing apparatus according to claim 1, wherein said extraction means is adapted to extract an image area of hue values within a predetermined range with respect to said particular hue value.

3. An image processing apparatus according to claim 1, wherein said input means comprises means for entering color image information of three primary colors and determining hue values from the color image information of three primary colors.

4. An image processing apparatus comprising:
   input means for entering color image information;
   designation means for designating a particular brightness value of said color image information; and
   extraction means for extracting image area from said color image information, based on said particular brightness value.

5. An image processing apparatus according to claim 4, wherein said particular brightness value is determined from the brightness value of a particular position in said color image information.

6. An image processing apparatus according to claim 4, wherein said extraction means is adapted to extract an image area of brightness values within a predetermined range with respect to said particular brightness value.

7. An image processing apparatus according to claim 4, wherein said input means comprises means for entering color image information of three primary colors and determining brightness values from the color image information of three primary colors.

8. A color image information processing apparatus comprising:
   input means for entering color image information;
   designation means for designating either a particular hue value or a particular brightness value of said color image information;
   first extraction means for extracting a predetermined image area from said color image information, based on said particular brightness value; and
   second extraction means for extracting a predetermined image area from said color image information, based on said particular hue value.

9. A color image information processing apparatus according to claim 8, further comprising selection means for selecting either said first extraction means or said second extraction means.

10. A color image information processing apparatus according to claim 9, wherein said selection means is adapted to select said first extraction means when said designation means selects an almost monochromatic color.

11. A color image information processing apparatus according to claim 9, wherein said selection means is adapted to select said second extraction means when said designation means selects a hue.

12. A color image information processing apparatus according to claim 8, wherein said particular brightness and hue values are determined from the brightness and hue values of a particular position in said color image information.

13. A color image information processing apparatus according to claim 8, wherein said first extraction means is adapted to extract an image area of brightness values within a predetermined range with respect to said particular brightness value.

14. A color image information processing apparatus according to claim 8, wherein said second extraction means is adapted to extract an image area of hue values within a predetermined range with respect to said particular hue value.

15. A color image information processing apparatus according to claim 8, wherein said input means comprises means for entering color image information of three primary colors and determining hue values and brightness values from the color image information of three primary colors.

16. A process for extracting an area of image information, comprising the steps of:
   providing image information;
   extracting an image area which has a characteristic value which is within a predetermined range;
   displaying thus extracted image area; and
   varying the width of said predetermined range according to thus displayed image area.

17. An image area extraction process according to claim 16, wherein said characteristic value is a brightness value.

18. An image area extracting process according to claim 16, wherein said image information is color image information and said characteristic value is a hue value.

19. An image area extracting process according to claim 16, wherein said varying step is repeated until a desired area is extracted.

20. A color image information processing apparatus comprising:

(a) input means for entering color image information;
(b) designation means for designating a particular point in said color image information; and
(c) extraction means for extracting an image area whose pixels have hue which is near a particular hue value, and whose pixels are all connected to the particular point designated by said designation means.

21. An apparatus according to claim 20, further comprising a second designation means for designating said particular hue value.

22. An apparatus according to claim 20, wherein said extraction means is adapted to extract an image area whose hue values are within a predetermined range of the particular hue value.

23. An apparatus according to claim 22, further comprising means for indicating said predetermined range.

24. An apparatus according to claim 20, wherein said input means comprises means for entering color image information of three primary colors and determining hue values from the color image information of three primary colors.

* * * * *

UNITED STATES PATENT AND TRADEMARK OFFICE
CERTIFICATE OF CORRECTION

PATENT NO. : 4,958,217
DATED : September 18, 1990
INVENTOR(S) : HIROYUKI KIMURA, ET AL.  Page 1 of 2

It is certified that error appears in the above-identified patent and that said Letters Patent is hereby corrected as shown below:

ON THE TITLE PAGE

IN [57] ABSTRACT

Line 4, "on" should read --of--.

COLUMN 2

Line 6, "objects features" should read --objects, features--.
Line 24, "extract" should read --extracting--.
Line 36, "determined" should read --determined for--.
Line 55, "by" should read --for--.
Line 61, "the selected" should read --the thus selected--.

COLUMN 3

Line 37, "equal" (second occurrence) should read --equal,--.
Line 41, "In mutually" should read --If so,--.
Line 42, "equal case," should be deleted.
Line 52, "mutually" should be deleted.

COLUMN 4

Line 19, "send" should read --sent--.
Line 62, "extract" should read --extracts--.

COLUMN 6

Line 10, "image area" should read --an image area--.

UNITED STATES PATENT AND TRADEMARK OFFICE
CERTIFICATE OF CORRECTION

PATENT NO. : 4,958,217

DATED : September 18, 1990

INVENTOR(S) : HIROYUKI KIMURA, ET AL.

It is certified that error appears in the above-identified patent and that said Letters Patent is hereby corrected as shown below:

COLUMN 7

Line 12, "extraction" should read --extracting--.

Signed and Sealed this

Seventeenth Day of March, 1992

Attest:

HARRY F. MANBECK, JR.

*Attesting Officer*  *Commissioner of Patents and Trademarks*